(12) United States Patent
Fujita et al.

(10) Patent No.: US 12,293,662 B2
(45) Date of Patent: May 6, 2025

(54) WIRELESS ROADSIDE DEVICE, TRAFFIC COMMUNICATION SYSTEM, AND TRAFFIC COMMUNICATION METHOD

(71) Applicant: KYOCERA Corporation, Kyoto (JP)

(72) Inventors: Hiroki Fujita, Yokohama (JP); Takeshi Suzuki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 72 days.

(21) Appl. No.: 18/299,502

(22) Filed: Apr. 12, 2023

(65) Prior Publication Data

US 2023/0245561 A1    Aug. 3, 2023

Related U.S. Application Data

(63) Continuation of application No. PCT/JP2021/042934, filed on Nov. 24, 2021.

(30) Foreign Application Priority Data

Nov. 26, 2020 (JP) ................................ 2020-196394

(51) Int. Cl.
*G08G 1/0967* (2006.01)
(52) U.S. Cl.
CPC .............................. *G08G 1/096783* (2013.01)
(58) Field of Classification Search
None
See application file for complete search history.

(56) References Cited

U.S. PATENT DOCUMENTS

| | | | |
|---|---|---|---|
| 11,282,377 B2 | 3/2022 | Fujimoto | |
| 2017/0034667 A1* | 2/2017 | Kumabe | G08G 1/096758 |

FOREIGN PATENT DOCUMENTS

| | | |
|---|---|---|
| JP | 2008-305151 A | 12/2008 |
| JP | 2016-208148 A | 12/2016 |
| JP | 2019-185592 A | 10/2019 |
| WO | 2017/138232 A1 | 8/2017 |
| WO | 2020/004320 A1 | 1/2020 |

OTHER PUBLICATIONS

"700 Mhz Band Intelligent Transport Systems"; Arib Standard; Arib STD-T109 Version 1.3; Association of Radio Industries and Businesses; Jul. 27, 2017; pp. 1-245.

* cited by examiner

*Primary Examiner* — John F Mortell
(74) *Attorney, Agent, or Firm* — Studebaker Brackett PLLC

(57) ABSTRACT

A wireless roadside device that performs roadside-to-vehicle communication with an in-vehicle communication device in a traffic communication system includes a roadside-to-vehicle communicator that cyclically transmits a roadside-to-vehicle message, and a controller that performs inhibition control to inhibit cyclic transmission of the roadside-to-vehicle message when the roadside-to-vehicle communicator receives no vehicle information message from the in-vehicle communication device.

10 Claims, 12 Drawing Sheets ly transmits a roadside-to-vehicle message. The controller performs inhibition control to inhibit cyclic transmission of the roadside-to-vehicle message when the roadside-to-vehicle communicator receives no vehicle information message from the in-vehicle communication device.

WIRELESS ROADSIDE DEVICE, TRAFFIC COMMUNICATION SYSTEM, AND TRAFFIC COMMUNICATION METHOD

RELATED APPLICATIONS

The present application is a continuation based on PCT Application No. PCT/JP2021/042934, filed on Nov. 24, 2021, which claims the benefit of Japanese Patent Application No. 2020-196394 filed on Nov. 26, 2020. The content of which is incorporated by reference herein in their entirety.

TECHNICAL FIELD

The present invention relates to a wireless roadside device, a traffic communication system, and a traffic communication method.

BACKGROUND OF INVENTION

In recent years, Intelligent Transport Systems (ITSs) have attracted attention as technology that can avoid dangers of traffic accidents. Under such a background, Non-Patent Document 1 defines a standard for a traffic communication system including a wireless roadside device corresponding to a base station provided on a roadside and an in-vehicle communication device corresponding to a mobile station provided in a vehicle.

In such a traffic communication system, the wireless roadside device and the in-vehicle communication device share the same frequency band in a time division manner. For example, a plurality of roadside-to-vehicle communication periods are provided within a predetermined control cycle, and the wireless roadside device transmits a radio signal in a roadside-to-vehicle communication period. The in-vehicle communication device transmits a radio signal by using a Carrier Sense Multiple Access/Collision Avoidance (CSMA/CA) scheme during a time other than the roadside-to-vehicle communication period and during a roadside-to-vehicle communication period not allocated to the base station.

CITATION LIST

Non-Patent Literature

Non-Patent Document 1: ARIB STD-T109 Version 1.3 "700 MHz Band Intelligent Transport System"

SUMMARY

In a first aspect, a wireless roadside device performs roadside-to-vehicle communication with an in-vehicle communication device in a traffic communication system. The wireless roadside device includes a roadside-to-vehicle communicator that cyclically transmit a roadside-to-vehicle message, and a controller that performs inhibition control to inhibit cyclic transmission of the roadside-to-vehicle message when the roadside-to-vehicle communicator receives no vehicle information message from the in-vehicle communication device.

In a second aspect, a traffic communication system includes a wireless roadside device including a roadside-to-vehicle communicator that performs roadside-to-vehicle communication with an in-vehicle communication device, and a controller that controls the roadside-to-vehicle communicator. The roadside-to-vehicle communicator cyclically transmits a roadside-to-vehicle message. The controller performs inhibition control to inhibit cyclic transmission of the roadside-to-vehicle message when the roadside-to-vehicle communicator receives no vehicle information message from the in-vehicle communication device.

In a third aspect, a traffic communication method is a method used in a traffic communication system that performs roadside-to-vehicle communication between an in-vehicle communication device and a wireless roadside device. The traffic communication method includes cyclically transmitting, by the wireless roadside device, a roadside-to-vehicle message, and performing, by the wireless roadside device, inhibition control to inhibit cyclic transmission of the roadside-to-vehicle message when the wireless roadside device receives no vehicle information message from the in-vehicle communication device.

DESCRIPTION OF EMBODIMENTS

The wireless roadside device typically transmits a roadside-to-vehicle message with a predetermined cycle by using a roadside-to-vehicle communication period (time slot) allocated to the wireless roadside device. The predetermined cycle is, for example, an integer multiple of a control cycle.

However, the wireless roadside device cyclically transmits the roadside-to-vehicle message even when no in-vehicle communication device is present within the communication range of the wireless roadside device.

Accordingly, radio resources related to the roadside-to-vehicle message may be wasted.

In view of this, the present invention provides enabling efficient use of radio resources related to the roadside-to-vehicle message.

A traffic communication system according to an embodiment will be described with reference to the drawings. Note that in the following description of the drawings, the same or similar components will be denoted by the same or similar reference signs.

Configuration of Traffic Communication System First, a configuration of a traffic communication system according to an embodiment will be described. The description below focuses on a traffic communication system that performs wireless communication based on the standard in Non-Patent Document 1; however, the embodiment is not limited to this standard. Wireless communication may be performed based on, for example, the Vehicle to Everything (V2X) standard of the Third Generation Partnership Project (3GPP).

Figure 1:
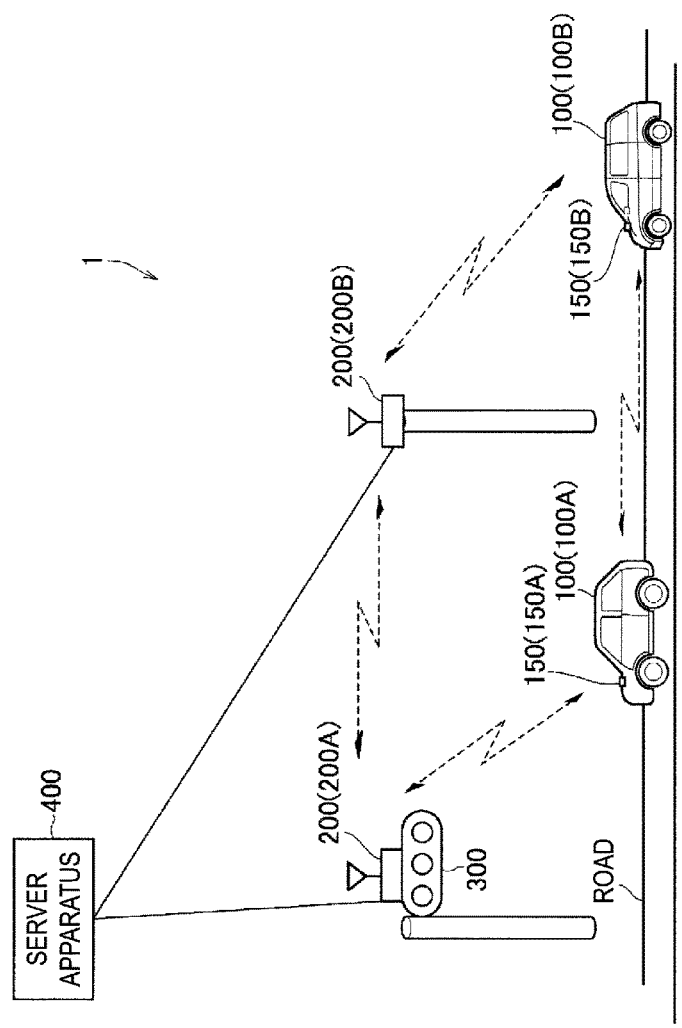
FIG. 1 is a diagram illustrating a configuration example of a traffic communication system according to an embodiment.

FIG. 1 is a diagram illustrating a configuration example of a traffic communication system 1 according to an embodiment. As illustrated in FIG. 1, the traffic communication system 1 includes a plurality of vehicles 100 traveling on a road, and a plurality of wireless roadside devices 200 provided near the road.

FIG. 1 illustrates vehicles 100A and 100B as the plurality of vehicles 100, and illustrates wireless roadside devices 200A and 200B as the plurality of wireless roadside devices 200. Note that, as the vehicles 100, automobiles are illustrated such as standard-sized automobiles or light automobiles, but the vehicles 100 may be any vehicles traveling on the road, for example, two-wheel motor vehicles (motorcycles) or the like. The vehicles 100 may be self-driving vehicles.

Each vehicle 100 is provided with an in-vehicle communication device 150. The in-vehicle communication device 150 may be a stationary communication device fixedly provided in the vehicle 100, or may be a portable communication device temporarily connected to the vehicle 100 via a cable.

Each wireless roadside device 200 is installed near the road. In the example illustrated in FIG. 1, a wireless roadside device 200A is installed on a traffic light 300 or a support of the traffic light 300 and operates in conjunction with the traffic light 300. The wireless roadside device 200B is installed on a support. Each wireless roadside device 200 is connected to a server apparatus 400 via a communication line. The server apparatus 400 may also be referred to as a central apparatus. The server apparatus 400 collects various pieces of traffic information, based on information received by the wireless roadside device 200, and manages road traffic.

In the traffic communication system 1 as described above, the wireless roadside device 200 and the in-vehicle communication device 150 perform roadside-to-vehicle communication with each other, and the in-vehicle communication devices 150 perform inter-vehicle communication with each other. In an embodiment, the in-vehicle communication device 150 shares a carrier frequency (frequency band) of 700 MHz band with the wireless roadside device 200 in a time division manner.

For example, with the roadside-to-vehicle communication, the in-vehicle communication device 150 receives a roadside-to-vehicle message transmitted from the wireless roadside device 200, and the wireless roadside device 200 receives a vehicle information message transmitted from the in-vehicle communication device 150. With the inter-vehicle communication, a vehicle information message transmitted from one in-vehicle communication device 150 is received by a different in-vehicle communication device 150. The roadside-to-vehicle communication and the inter-vehicle communication allow recognition of the state of surrounding vehicles, traffic information, the presence or absence of a pedestrian, and the like, and enable assistance in avoiding the danger of traffic accidents. The vehicle information message received by the wireless roadside device 200 can be used for smoothing of traffic flow and the like.

The roadside-to-vehicle message is a message including information related to a road. The roadside-to-vehicle message has a predetermined format conforming to, for example, "Communication application common standard for ITS roadside radio unit" or "Communication application (light and radio wave experiment) standard for 5.8 GHz band/700 MHz band wireless DSSS" issued by Universal Traffic Management System (UTMS) Society.

The vehicle information message is a message including information related to a vehicle 100. The vehicle information message has a predetermined format conforming to, for example, "Inter-vehicle communication message specification for ITS Connect system" issued by ITS Connect Promotion Consortium.

In the traffic communication system 1, the wireless roadside devices 200 perform inter-roadside communication with each other. With the inter-roadside communication, an inter-roadside message transmitted from one wireless roadside device 200 is received by a different wireless roadside device 200.

Wireless communication by broadcasting may be used for each of the roadside-to-vehicle communication, the inter-vehicle communication, and the inter-roadside communication. For example, for a radio signal (communication packet) to be transmitted, only a broadcast address may be defined as a destination address (destination MAC address).

Figure 2:
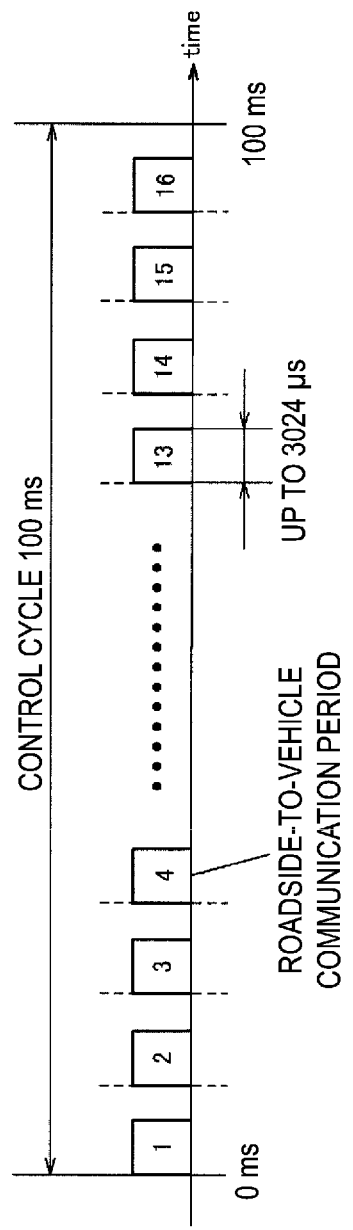
FIG. 2 is a diagram illustrating an example of a roadside-to-vehicle communication period.

Roadside-to-vehicle Communication Period A roadside-to-vehicle communication period in the traffic communication system 1 according to an embodiment will be described. FIG. 2 is a diagram illustrating an example of the roadside-to-vehicle communication period.

As illustrated in FIG. 2, the wireless roadside device 200 basically communicates with a cycle of 100 ms. The wireless roadside device 200 transmits, to a surrounding in-vehicle communication device 150, a roadside-to-vehicle message including a transmission time and roadside-to-vehicle communication period information (the number of transfers and the length of the roadside-to-vehicle communication period) as transmission information of the wireless roadside device 200 to secure a transmission duration for the wireless roadside device 200. A synchronization accuracy of ±16 μs or less is assumed to be maintained between the wireless roadside devices 200.

The in-vehicle communication device 150 performs time synchronization based on the transmission time received from the wireless roadside device 200 and stops the transmission of the in-vehicle communication device 150 based on the roadside-to-vehicle communication period information, and thus performs the transmission at a timing other than the transmission period for the wireless roadside device 200. Specifically, the in-vehicle communication device 150 transmits the vehicle information message by using a CSMA/CA scheme during a time other than the roadsideto-vehicle communication period or during a roadside-to-vehicle communication period not allocated to the wireless roadside device 200.

A control unit time (unit) is 16 μs within a control cycle of 100 ms, and the control cycle includes 6250 units. Up to "16" roadside-to-vehicle communication periods (time slots) can be set in one control cycle, and are arranged at intervals of 390 units (6240 μs) from the beginning of the control cycle. The maximum value of the length of the roadside-to-vehicle communication period that can be set is 189 units (3024 μs).

The wireless roadside device 200 can use at least one of 16 roadside-to-vehicle communication periods in one control cycle. The wireless roadside device 200 broadcasts a roadside-to-vehicle message including information related to the roadside-to-vehicle communication period of the wireless roadside device 200.

The in-vehicle communication device 150 recognizes the roadside-to-vehicle communication period used by the wireless roadside device 200 based on the roadside-to-vehicle communication period information to avoid transmitting radio signals during the roadside-to-vehicle communication period used by the wireless roadside device 200. The in-vehicle communication device 150 manages the roadside-to-vehicle communication time information received from the wireless roadside device 200, and broadcasts an inter-vehicle message including the managed roadside-to-vehicle communication period information.

Figure 3:
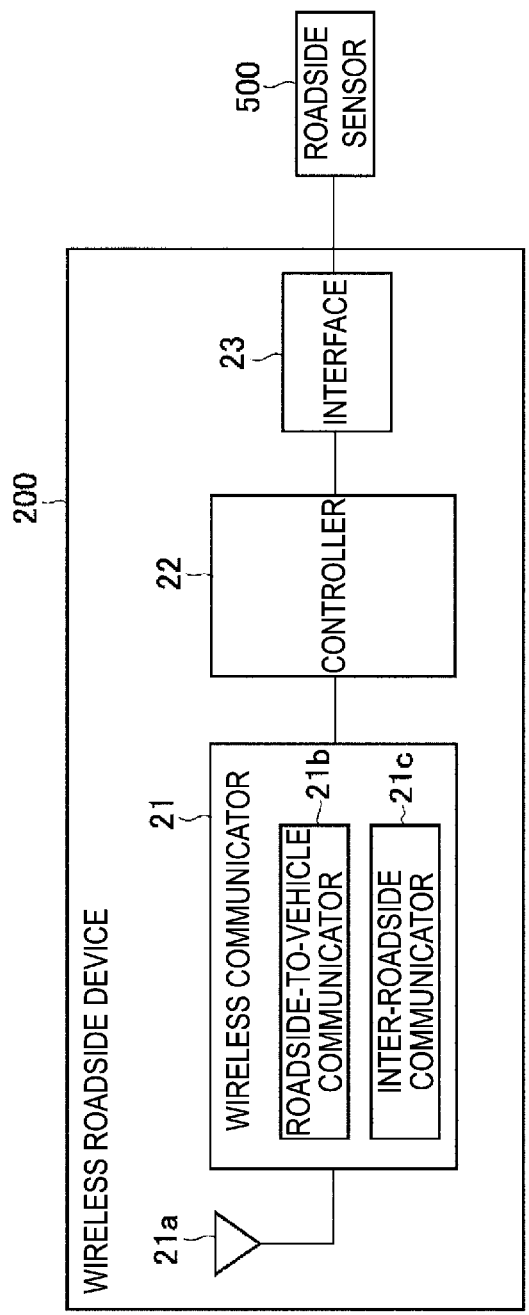
FIG. 3 is a diagram illustrating a configuration example of a wireless roadside device according to an embodiment.

Configuration of Wireless Roadside Device A configuration of the wireless roadside device 200 according to an embodiment will be described. FIG. 3 is a diagram illustrating a configuration example of the wireless roadside device 200.

As illustrated in FIG. 3, the wireless roadside device 200 includes an antenna 21a, a wireless communicator 21, a controller 22, and an interface 23.

The wireless communicator 21 performs wireless communication via the antenna 21a. The antenna 21a may be a non-directional antenna, or may be a directional antenna having directivity. The antenna 21a may be an adaptive array antenna that can dynamically change its directivity.

In an embodiment, the wireless communication scheme of the wireless communicator 21 is a scheme conforming to the Association of Radio Industries and Businesses (ARIB) T109. However, the wireless communication scheme of the wireless communicator 21 may be a scheme conforming to the V2X standard of the 3GPP or a scheme conforming to a wireless LAN standard such as the Institute of Electrical and Electronics Engineers (IEEE) 802.11 series. The wireless communicator 21 may be configured to conform to all these communication standards.

The wireless communicator 21 converts a radio signal received by the antenna 21a into a baseband signal and outputs the baseband signal to the controller 22. The wireless communicator 21 converts a baseband signal output by the controller 22 into a radio signal and transmits the radio signal from the antenna 21a.

The wireless communicator 21 includes a roadside-to-vehicle communicator 21b that performs roadside-to-vehicle communication with the in-vehicle communication device 150, and an inter-roadside communicator 21c that performs inter-roadside communication with a different wireless roadside device 200. In an embodiment, the roadside-to-vehicle communication and the inter-roadside communication are performed by broadcasting. Note that the roadside-to-vehicle communication and the inter-roadside communication may be performed by unicasting or by multicasting.

A packet constituting the roadside-to-vehicle message transmitted to a vehicle 100 by the roadside-to-vehicle communication may include identification information used for identification of a transmission source, synchronization information indicating a method of synchronization with the wireless roadside device 200, a transmission time of the packet, and period information indicating the period of the roadside-to-vehicle communication (for example, the number of transfers in the roadside-to-vehicle communication and the length of the roadside-to-vehicle communication period).

The controller 22 controls various functions of the wireless roadside device 200. The controller 22 includes at least one memory and at least one processor electrically connected to the memory. The memory includes a volatile memory and a non-volatile memory and stores information used for processing in the processor and programs executed by the processor. The processor executes programs stored in the memory to perform various types of processing.

The interface 23 is connected to at least one roadside sensor 500 via a wired line and/or a wireless line. The roadside sensor 500 is a sensor for detecting an obstacle (dangerous object) on a road. In an embodiment, the roadside sensor 500 is an image sensor that outputs a captured image obtained by capturing an image of a road. Note that the roadside sensor 500 may be integrated with the wireless roadside device 200. The roadside sensor 500 may be a light detection and ranging (LiDAR) sensor that detects a moving object and outputs detection data (point cloud data). The roadside sensor 500 may be any sensor as long as the sensor can detect an obstacle on a road, and may be a millimeter wave sensor, an ultrasound sensor, an infrared sensor, or the like.

The interface 23 is also connected to the server apparatus 400 via a wired line and/or a wireless line. The interface 23 may be connected to the traffic light 300 via a wired line and/or a wireless line.

For example, the controller 22 generates a roadside-to-vehicle message based on information acquired via the interface 23, and outputs the generated roadside-to-vehicle message to the roadside-to-vehicle communicator 21b. The roadside-to-vehicle communicator 21b transmits (broadcasts) the roadside-to-vehicle message with a predetermined cycle. The predetermined cycle is, for example, an integer multiple of the control cycle (100 ms).

Configuration of Vehicle

Figure 4:
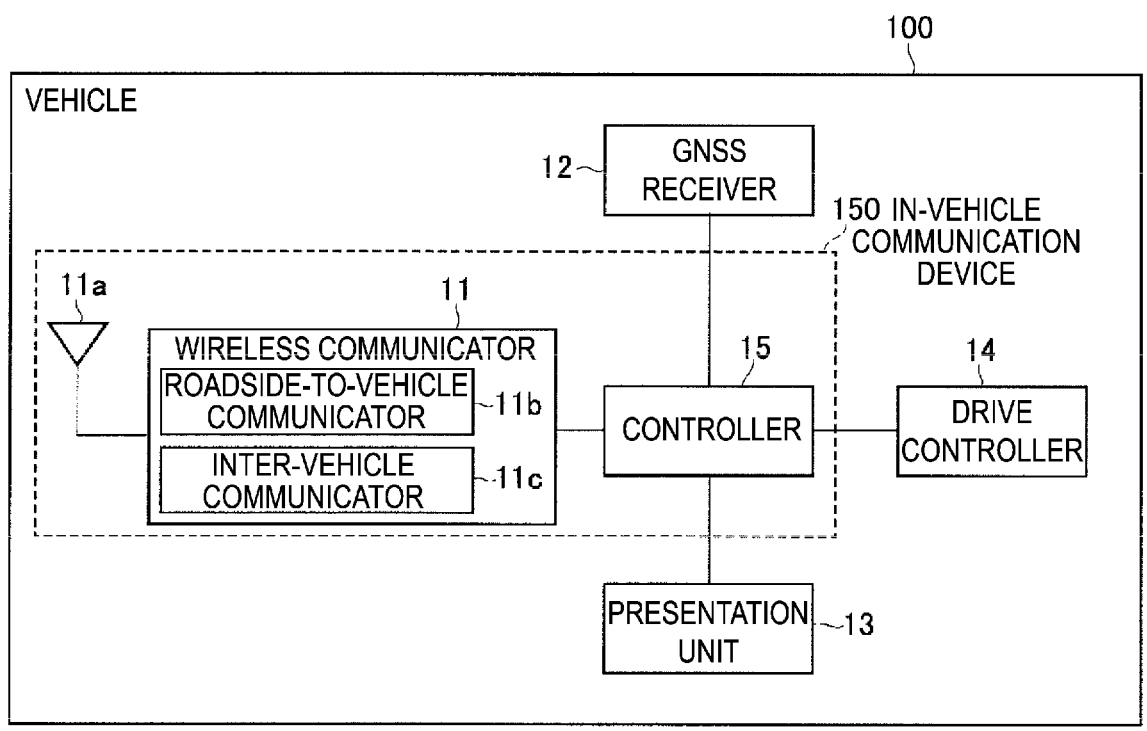
FIG. 4 is a diagram illustrating a configuration example of a vehicle according to an embodiment.

In an embodiment, a configuration of the vehicle 100 will be described. FIG. 4 is a diagram illustrating a configuration example of the vehicle 100.

As illustrated in FIG. 4, the vehicle 100 includes an in-vehicle communication device 150, a global navigation satellite system (GNSS) receiver 12, a presentation unit 13, and a drive controller 14. The in-vehicle communication device 150 includes an antenna 11a, a wireless communicator 11, and a controller 15.

The wireless communicator 11 performs wireless communication via the antenna 11a. In an embodiment, the wireless communication scheme of the wireless communicator 11 is a scheme conforming to the ARIB T109. Note that the wireless communication scheme of the wireless communicator 11 may be a scheme conforming to the V2X standard of the 3GPP or a scheme conforming to a wireless LAN standard such as the IEEE 802.11 series. The wireless communicator 11 may be configured to conform to all these communication standards.

The wireless communicator 11 converts a radio signal received by the antenna 11a into a baseband signal and outputs the baseband signal to the controller 15. The wireless communicator 11 converts a baseband signal output by the controller 15 into a radio signal and transmits the radio signal from the antenna 11*a*.

The wireless communicator 11 includes a roadside-to-vehicle communicator 11*b* that performs roadside-to-vehicle communication with the wireless roadside device 200, and an inter-vehicle communicator 11*c* that performs inter-vehicle communication with a different in-vehicle communication device 150 (a different vehicle 100). In an embodiment, the roadside-to-vehicle communication and the inter-vehicle communication are performed by broadcasting. Note that the roadside-to-vehicle communication and the inter-vehicle communication may be performed by unicasting or by multicasting.

When the wireless communicator 11 conforms to, for example, the ARIB T109 standard, the wireless communicator 11 may have a function of performing carrier-sensing to determine whether radio frequencies (for example, 700 MHz band) are available. The wireless communicator 11 may transmit the vehicle information message at a timing determined depending on the result of the carrier-sensing.

The GNSS receiver 12 performs positioning based on GNSS satellite signals, and outputs, to the controller 15, GNSS position information indicating the current geographical position (latitude and longitude) of the vehicle 100. The GNSS receiver 12 may include at least one GNSS receiver selected from the group consisting of GPS, global navigation satellite system (GLONASS), Indian regional navigational satellite system (IRNSS), COMPASS, Galileo, and quasi-zenith satellite system (QZSS), for example.

Under control of the controller 15, the presentation unit 13 presents information to a driver of the vehicle 100. For example, the presentation unit 13 includes at least one of a display that displays information or a speaker that auditorily outputs information.

The drive controller 14 controls an engine or a motor as a source of power, a power transmission mechanism, brakes, and the like. When the vehicle 100 is a self-driving vehicle, the drive controller 14 may control drive of the vehicle 100 in cooperation with the controller 15.

The controller 15 controls various functions of the in-vehicle communication device 150 (and the vehicle 100). The controller 15 includes at least one memory and at least one processor electrically connected to the memory. The memory includes a volatile memory and a non-volatile memory and stores information used for processing in the processor and programs executed by the processor. The processor executes programs stored in the memory to perform various types of processing.

For example, the controller 15 controls the presentation unit 13 based on the roadside-to-vehicle message received by the roadside-to-vehicle communicator 11*b* from the wireless roadside device 200. The roadside-to-vehicle message may include traffic light information related to a traffic light color of the traffic light 300. The controller 15 controls the presentation unit 13 to display the traffic light information. When the vehicle 100 is a self-driving vehicle, the controller 15 may control, based on the traffic light information, drive of the vehicle 100 in cooperation with the drive controller 14.

The controller 15 generates and outputs a vehicle information message to the wireless communicator 11 (the roadside-to-vehicle communicator 11*b* and the inter-vehicle communicator 11*c*). The wireless communicator 11 transmits the vehicle information message at a timing determined depending on the result of the carrier-sensing. The vehicle information message includes, for example, the position of vehicle 100 (GNSS position information) or the vehicle speed.

Example of Operation Environment of Traffic Communication System

Figure 5:
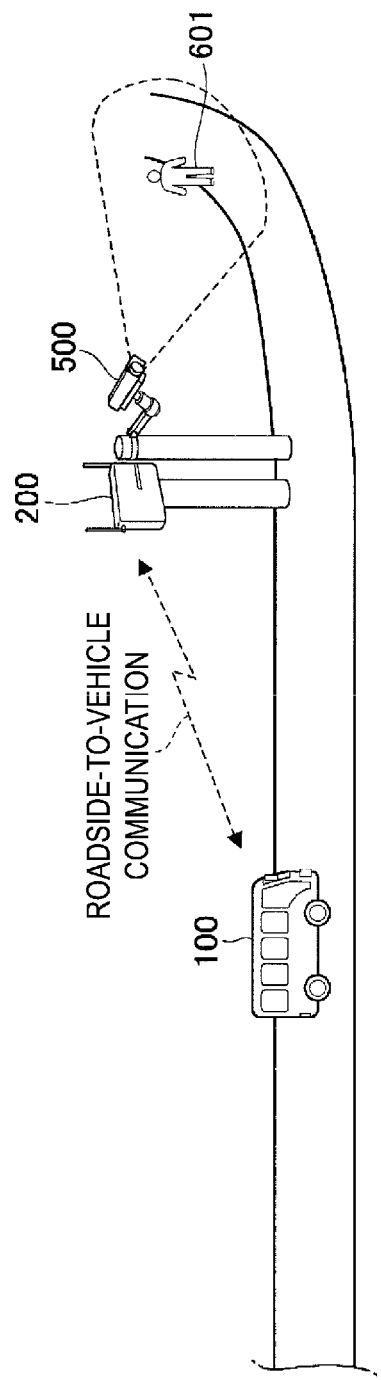
FIG. 5 is a diagram illustrating an example of an operation environment of the traffic communication system according to an embodiment.

An example of operation environment of the traffic communication system 1 according to an embodiment will be described. FIG. 5 is a diagram illustrating an example of an operation environment of the traffic communication system 1 according to an embodiment.

As illustrated in FIG. 5, a vehicle 100 travels on a road. In the example illustrated in FIG. 5, the vehicle 100 is a self-driving vehicle, specifically a self-driving bus. The vehicle 100 may perform self-driving (autonomous traveling) using an in-vehicle sensor of the vehicle 100. The road may be an exclusive bus road used by self-driving buses only.

Also, the vehicle 100 utilizes information from traffic infrastructures for self-driving. In the example illustrated in FIG. 5, the road includes a curve to the left as viewed from the vehicle 100. The condition behind such a curve is difficult to be detected by the in-vehicle sensor of the vehicle 100. An obstacle 601 may be present on the road behind the curve. The obstacle 601 refers to an object that hinders passage of a vehicle. The types of the obstacle 601 include, for example, a pedestrian, a fallen object, a disabled vehicle, and a road damage (for example, a hole).

In response to detecting the obstacle 601 on the road ahead in the travel direction, the vehicle 100 decelerates to avoid collision with the obstacle 601 and stops in front of the obstacle 601. For such an operation, the vehicle 100 driven, for example, at a speed of 60 km/h needs to detect the obstacle 601 located 100 m ahead, but the condition behind the curve is difficult to be detected by the in-vehicle sensor of the vehicle 100.

In an embodiment, to notify the vehicle 100 of the condition behind the curve, the wireless roadside device 200 connected to the roadside sensor 500 is installed short of the curve. With the roadside-to-vehicle communication, the wireless roadside device 200 transmits, to the vehicle 100 (in-vehicle communication device 150), a roadside-to-vehicle message including danger notification data based on a detection result from the roadside sensor 500. Thus, the vehicle 100 can detect the obstacle 601, which is difficult to be detected by the in-vehicle sensor, with the assistance of the wireless roadside device 200.

First Operation Example of Traffic Communication System

A first operation example of the traffic communication system 1 according to an embodiment will be described.

As described above, the wireless roadside device 200 notifies the in-vehicle communication device 150 of a danger in traffic (for example, the presence of an obstacle) based on an output of the roadside sensor 500, allowing the danger of traffic accidents to be avoided.

However, the wireless roadside device 200 typically transmits the roadside-to-vehicle message with a predetermined cycle by using a roadside-to-vehicle communication period (time slot) allocated to the wireless roadside device 200. The predetermined cycle is, for example, an integer multiple of a control cycle. Accordingly, in a case of detecting a danger immediately after transmitting a roadside-to-vehicle message, the wireless roadside device 200 cannot notify the in-vehicle communication device 150 until the next transmission opportunity for the roadside-to-vehicle message. Thus, a delay may occur in the notification of a danger to the in-vehicle communication device 150.

In the wireless roadside device 200 according to an embodiment, the roadside-to-vehicle communicator 21b transmits a first roadside-to-vehicle message having a predetermined format with a predetermined cycle (a cycle equal to an integer multiple of the control cycle). The controller 22 generates a second roadside-to-vehicle message related to the presence or absence of a danger in traffic, based on the output of the roadside sensor 500. The roadside-to-vehicle communicator 21b transmits the second roadside-to-vehicle message with a short cycle shorter than the predetermined cycle. Thus, transmitting the second roadside-to-vehicle message related to the presence or absence of a danger in traffic with the short cycle shorter than the predetermined cycle allows a delay in notification of the danger to the in-vehicle communication device 150 to be reduced.

Figure 6:
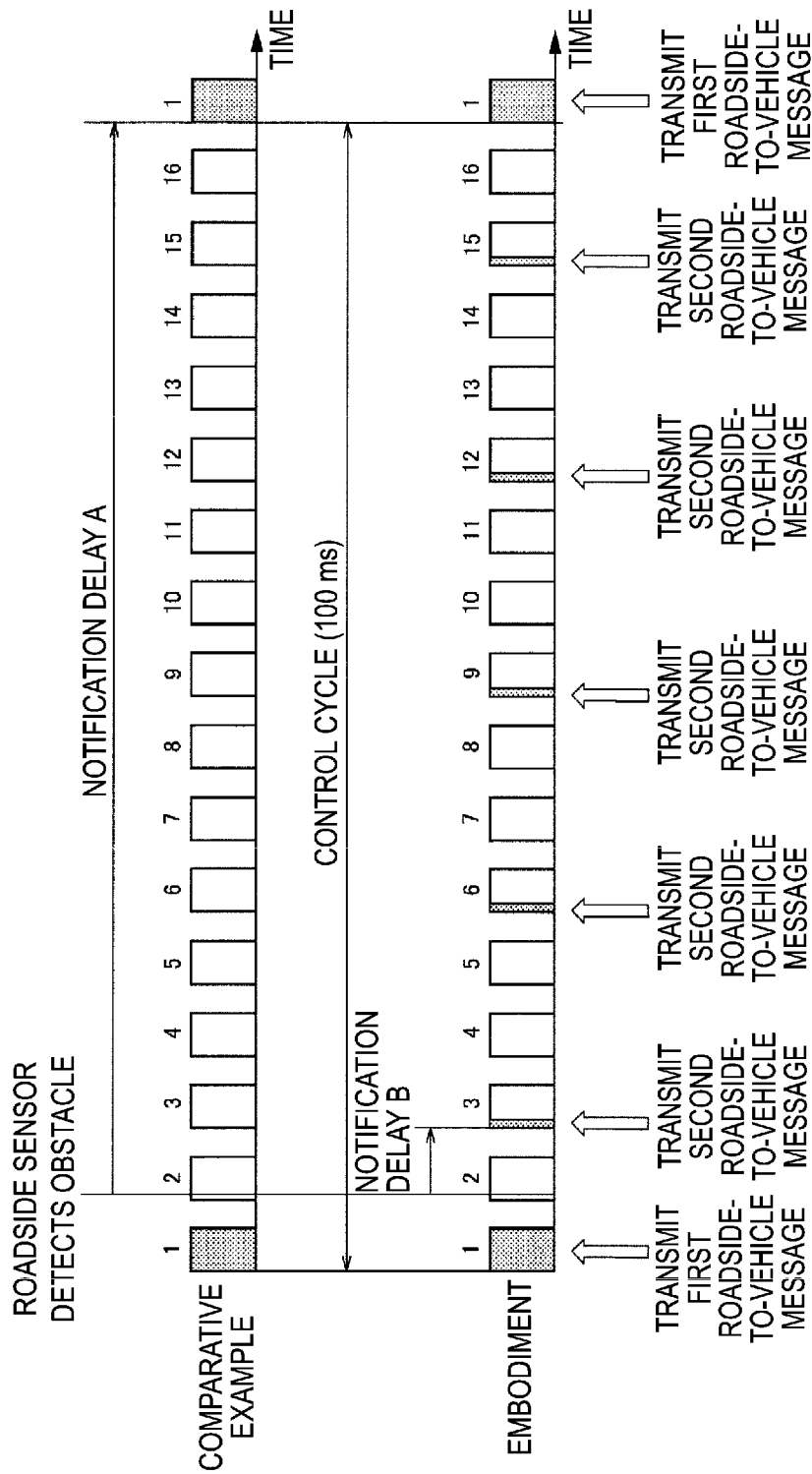
FIG. 6 is a diagram illustrating a first operation example of the traffic communication system according to an embodiment.

FIG. 6 is a diagram illustrating the first operation example of the traffic communication system 1 according to an embodiment.

As illustrated in FIG. 6, in a comparative example, the roadside-to-vehicle communicator 21b of the wireless roadside device 200 transmits, with the predetermined cycle (here, a control cycle of 100 ms), the first roadside-to-vehicle message having the predetermined format. One control cycle is assumed to contain 16 roadside-to-vehicle communication periods (time slots), and the first roadside-to-vehicle communication period is assumed to be allocated to the wireless roadside device 200. Here, the roadside sensor 500 is assumed to detect an obstacle immediately after the roadside-to-vehicle message is transmitted during the first roadside-to-vehicle communication period. In the comparative example, the roadside-to-vehicle message fails to be transmitted until the next first roadside-to-vehicle communication period, and thus a significant notification delay A occurs. Occurrence of such a significant notification delay A leads to difficulty in the vehicle 100 decelerating to stop short of the obstacle 601 in order to avoid collision with the obstacle 601.

On the other hand, in an embodiment, the roadside-to-vehicle communicator 21b of the wireless roadside device 200 transmits the second roadside-to-vehicle message related to the presence or absence of a danger in traffic with a short cycle (for example, a 20-ms cycle) shorter than the predetermined cycle (here, the control cycle of 100 ms). Thus, even when the roadside sensor 500 detects an obstacle immediately after the first roadside-to-vehicle message is transmitted during the first roadside-to-vehicle communication period, the second roadside-to-vehicle message can be transmitted during the third roadside-to-vehicle communication period. Accordingly, the second roadside-to-vehicle message involves only an insignificant notification delay B. Such a reduced notification delay allows the vehicle 100 to easily decelerate to stop short of the obstacle 601 in order to avoid collision with the obstacle 601.

Note that "the presence of a danger" may mean the presence of an obstacle, or a high level of danger. "The absence of a danger" may mean the absence of an obstacle, or a low level of danger.

In an embodiment, in response to the roadside-to-vehicle communicator 11b receiving the second roadside-to-vehicle message indicating the presence of a danger, the in-vehicle communication device 150 (controller 15) of the vehicle 100 may perform control for reducing the speed of the vehicle 100. For example, the controller 15 of the vehicle 100 controls the presentation unit 13 to present the driver with information urging deceleration of the vehicle 100. When the vehicle 100 is a self-driving vehicle, the controller 15 of the vehicle 100 may cooperate with the drive controller 14 in causing the vehicle 100 to automatically decelerate.

The data size of the second roadside-to-vehicle message is smaller than the data size of the first roadside-to-vehicle message. For example, the first roadside-to-vehicle message is a message including various pieces of information such as road alignment information, service assistance information, traffic light information, regulation information, vehicle detection information, and crossing pedestrian detection information. In contrast, the second roadside-to-vehicle message may be a message including the vehicle detection information and/or the crossing pedestrian detection information and excluding the road alignment information, the service assistance information, the traffic light information, and the regulation information. The second roadside-to-vehicle message may be a message including a 1-bit flag simply indicating the presence or absence of a danger.

In an embodiment, the roadside-to-vehicle communicator 21b of the wireless roadside device 200 transmits the second roadside-to-vehicle message by using a reserved time slot reserved with a short cycle among a plurality of time slots (here, 16 inter-roadside communication periods) provided within a predetermined cycle. In the example of FIG. 6, the reserved time slots reserved with the short cycle are the 3rd, 6th, 9th, 12th and 15th time slots. Making such a reservation secures a transmission opportunity for the second roadside-to-vehicle message.

In an embodiment, the roadside-to-vehicle communicator 21b of the wireless roadside device 200 transmits the second roadside-to-vehicle message by using only a partial time interval of the reserved time slot. In the example of FIG. 6, the wireless roadside device 200 uses a partial time interval (sub-slot) at the head of each of the 3rd, 6th, 9th, 12th, and 15th reserved time slots to transmit the second roadside-to-vehicle message. Here, a different wireless roadside device 200 uses the time interval other than the partial time interval in each reserved time slot. That is, a plurality of wireless roadside devices 200 shares one time slot in a time division manner. This allows roadside-to-vehicle communication resources to be effectively utilized, enhancing resource utilization efficiency.

Note that, in the example of FIG. 6, the wireless roadside device 200 uses the entire first time slot as an inter-roadside communication period for transmitting the first roadside-to-vehicle message.

In an embodiment, when the controller 22 detects a danger (for example, an obstacle) based on the output of the roadside sensor 500, the roadside-to-vehicle communicator 21b of the wireless roadside device 200 transmits, with the predetermined cycle, the first roadside-to-vehicle message including detailed information indicating details of the danger. For example, the second roadside-to-vehicle message is a message that merely notifies the presence or absence of a danger, whereas the first roadside-to-vehicle message is used to notify the details of the danger, for example, at least one selected from the group consisting of information related to type of the obstacle, information related to the position of the obstacle, and information from the roadside sensor. Thus, the vehicle 100 can start deceleration in response to reception of the second roadside-to-vehicle message, and can subsequently recognize the details of the danger in response to reception of the first roadside-to-vehicle message.

When the controller 22 detects a danger (for example, an obstacle) based on the output of the roadside sensor 500, the roadside-to-vehicle communicator 21b of the wireless roadside device 200 transmits, with the short cycle, the second roadside-to-vehicle message indicating the presence of the danger. The second roadside-to-vehicle message indicating the presence of a danger may be, for example, a roadside-to-vehicle message including flag information indicating the presence of the danger.

Figure 7:
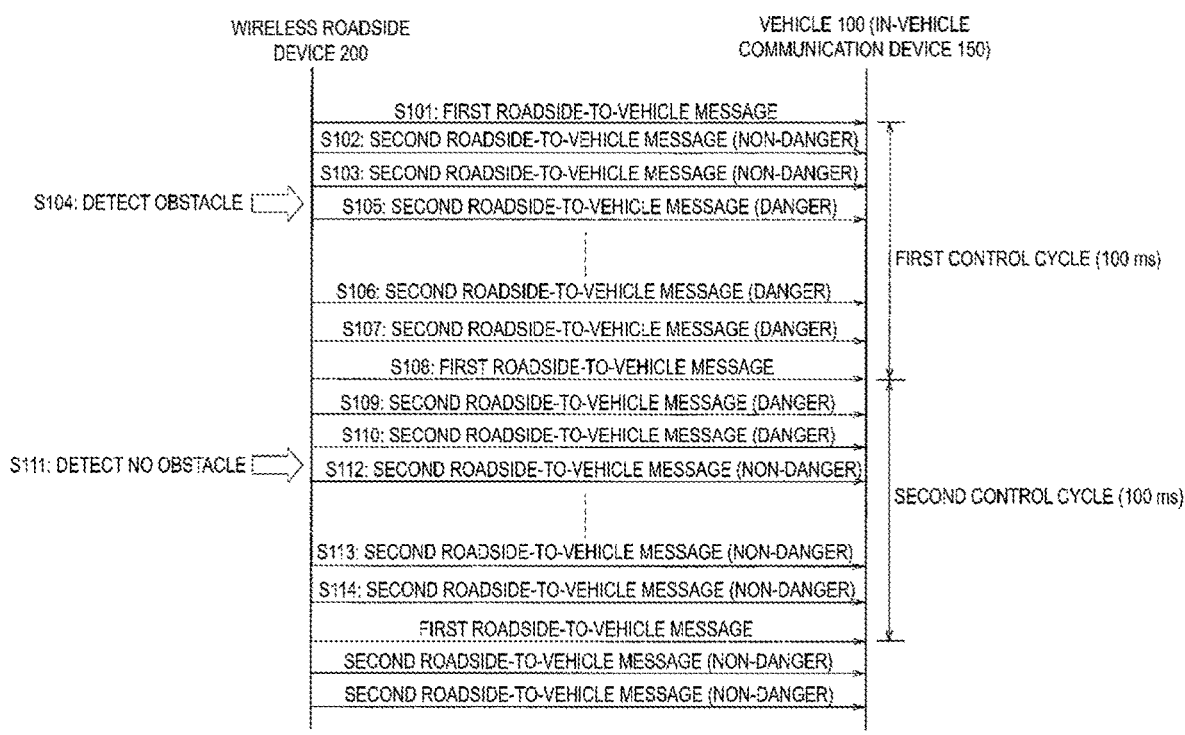
FIG. 7 is a diagram illustrating the first operation example of the traffic communication system according to an embodiment.

When the controller 22 detects no danger (for example, no obstacle) based on the output of the roadside sensor 500, the roadside-to-vehicle communicator 21b of the wireless roadside device 200 may transmit, with the short cycle, the second roadside-to-vehicle message indicating the absence of a danger, as illustrated in FIG. 7. The second roadside-to-vehicle message indicating the absence of a danger may be, for example, a roadside-to-vehicle message including flag information indicating the absence of a danger. Thus, the vehicle 100 can travel on the road after confirming the absence of a danger.

In the example of FIG. 7, the roadside-to-vehicle communicator 21b of the wireless roadside device 200 first transmits the first roadside-to-vehicle message within the first control cycle (step S101), and then transmits, with the short cycle, the second roadside-to-vehicle message indicating the absence of a danger (steps S102 and S103).

Upon detecting an obstacle based on the output of the roadside sensor 500 (step S104), the controller 22 of the wireless roadside device 200 controls the roadside-to-vehicle communicator 21b to transmit, with the short cycle, the second roadside-to-vehicle message indicating the presence of the danger (steps S105 to S107).

Within the second control cycle, the controller 22 of the wireless roadside device 200 controls the roadside-to-vehicle communicator 21b to transmit (step S108) the first roadside-to-vehicle message including the detailed information related to the obstacle (danger) detected in step S104. The controller 22 of the wireless roadside device 200 transmits, with the short cycle, the second roadside-to-vehicle message indicating the presence of the danger (steps S109 and S110).

The controller 22 of the wireless roadside device 200 no longer detects an obstacle based on the output of the roadside sensor 500 (step S111). The controller 22 of the wireless roadside device 200 transmits, with the short cycle, the second roadside-to-vehicle message indicating the absence of a danger (steps S112 to S114).

Figure 8:
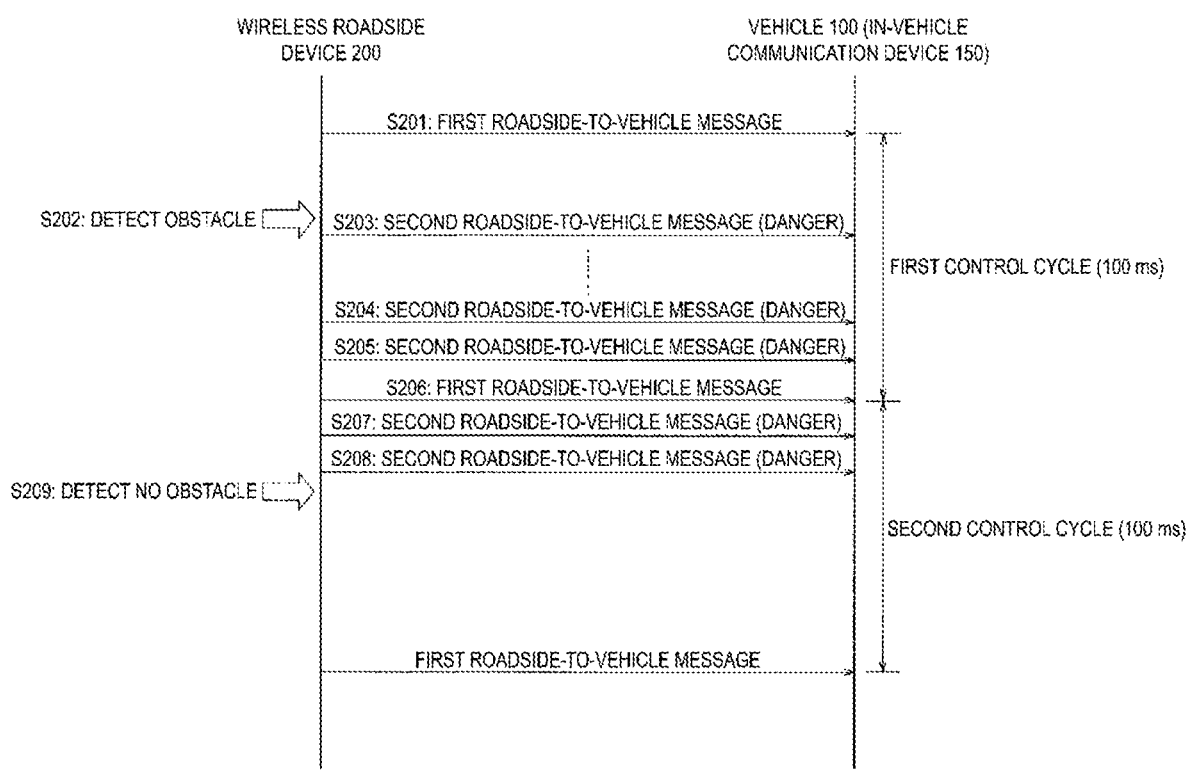
FIG. 8 is a diagram illustrating the first operation example of the traffic communication system according to an embodiment.

Alternatively, when the controller 22 detects no danger (for example, no obstacle) based on the output of the roadside sensor 500, the roadside-to-vehicle communicator 21b may stop the transmission of the second roadside-to-vehicle message as illustrated in FIG. 8. This enables frequent transmission of the second roadside-to-vehicle message to be inhibited to reduce power consumption of the wireless roadside device 200, and allows contribution to saving of radio resources.

In the example of FIG. 8, the roadside-to-vehicle communicator 21b of the wireless roadside device 200 first transmits the first roadside-to-vehicle message within the first control cycle (step S201). The controller 22 of the wireless roadside device 200 controls the roadside-to-vehicle communicator 21b to avoid transmitting the second roadside-to-vehicle message while no danger is detected.

Upon detecting an obstacle based on the output of the roadside sensor 500 (step S202), the controller 22 of the wireless roadside device 200 controls the roadside-to-vehicle communicator 21b to transmit, with the short cycle, the second roadside-to-vehicle message indicating the presence of a danger (steps S203 to S205).

Within the second control cycle, the controller 22 of the wireless roadside device 200 controls the roadside-to-vehicle communicator 21b to transmit (step S206) the first roadside-to-vehicle message including the detailed information related to the obstacle (danger) detected in step S202. The controller 22 of the wireless roadside device 200 transmits, with the short cycle, the second roadside-to-vehicle message indicating the presence of the danger (steps S207 and S208).

The controller 22 of the wireless roadside device 200 no longer detects an obstacle based on the output of the roadside sensor 500 (step S209). The controller 22 of the wireless roadside device 200 stops transmission of the second roadside-to-vehicle message.

Second Operation Example of Traffic Communication System

A second operation example of the traffic communication system 1 according to an embodiment will be described.

As described above, the wireless roadside device 200 cyclically transmits (broadcasts) the roadside-to-vehicle message by using the roadside-to-vehicle communication period (time slot) allocated to the wireless roadside device 200. However, the wireless roadside device 200 cyclically transmits the roadside-to-vehicle message even when no in-vehicle communication device 150 is present within the communication range of the wireless roadside device 200, and thus the radio resources may be wasted and the wireless roadside device 200 may consume increased power. In particular, since the above-described second roadside-to-vehicle message is transmitted with the short cycle, such issues may become significant.

Figure 9:
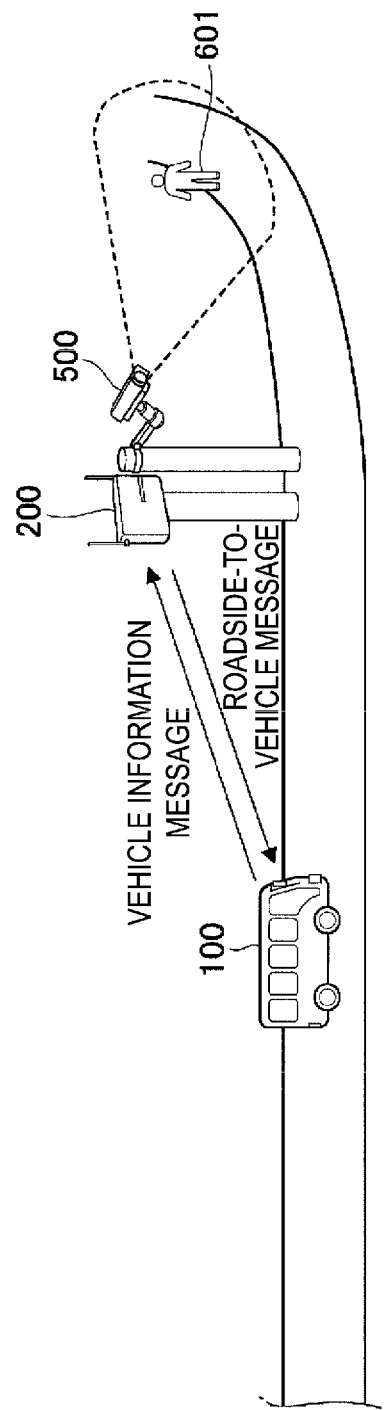
FIG. 9 is a diagram illustrating a second operation example of the traffic communication system according to an embodiment.

FIG. 9 is a diagram illustrating the second operation example of the traffic communication system 1.

As illustrated in FIG. 9, the vehicle 100 (in-vehicle communication device 150) transmits (broadcasts) a vehicle information message. When the wireless roadside device 200 receives the vehicle information message, the in-vehicle communication device 150 can be considered to be present within the communication range of the wireless roadside device 200. On the other hand, when the wireless roadside device 200 receives no vehicle information message, the in-vehicle communication device 150 can be considered not to be present within the communication range of the wireless roadside device 200.

When the roadside-to-vehicle communicator 21b receives no vehicle information message from the in-vehicle communication device 150, the controller 22 of the wireless roadside device 200 according to an embodiment performs inhibition control for inhibiting cyclic transmission of the roadside-to-vehicle message. This enables enhancement of the utilization efficiency of radio resources and allows reduction in the power consumption of the wireless roadside device 200. Note that "when no vehicle information message is received" may be a case where the state where no vehicle information message is received continues for a certain time.

The inhibition control may include control for stopping the cyclic transmission of the roadside-to-vehicle message (hereinafter referred to as "stop control"). This enables enhancement of the effect of improving the utilization efficiency of radio resources and the effect of reducing the power consumption of the wireless roadside device 200.

The inhibition control may include control for extending the cycle for transmitting the roadside-to-vehicle message (hereinafter, referred to as "extension control"). This enables enhancement of the utilization efficiency of radio resources and allows reduction in the power consumption of the wireless roadside device 200 while ensuring the transmission opportunity for the roadside-to-vehicle message. The extension control may be control for extending the cycle for transmitting the roadside-to-vehicle message in stages with the elapse of the time during which the roadside-to-vehicle communicator 21b receives no vehicle information message from the in-vehicle communication device 150. For example, the control may be such that the cycle for transmitting the roadside-to-vehicle message is twice as long as a basic cycle when the roadside-to-vehicle communicator 21b receives no vehicle information message from the in-vehicle communication device 150 for 10 continuous seconds and such that the cycle for transmitting the roadside-to-vehicle message is three times as long as the basic cycle when the roadside-to-vehicle communicator 21b receives no vehicle information message from the in-vehicle communication device 150 for further 10 continuous seconds.

The inhibition control may be a combination of the stop control and the extension control. For example, the control may be such that the cycle for transmitting the roadside-to-vehicle message is twice as long as the basic cycle when the roadside-to-vehicle communicator 21b receives no vehicle information message from the in-vehicle communication device 150 for 10 continuous seconds and such that the cyclic transmission of the roadside-to-vehicle message is stopped when the roadside-to-vehicle communicator 21b receives no vehicle information message from the in-vehicle communication device 150 for further 10 continuous seconds.

Figure 10:
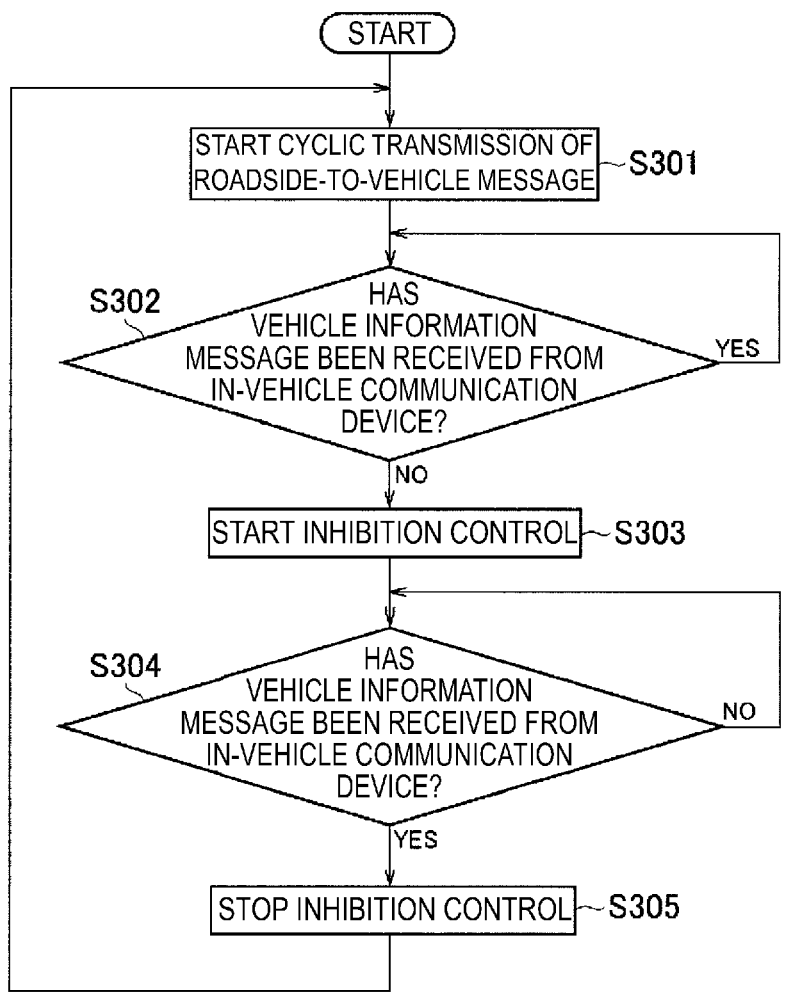
FIG. 10 is a diagram illustrating the second operation example of the traffic communication system according to an embodiment.

In an embodiment, the controller 22 of the wireless roadside device 200 stops the inhibition control when the roadside-to-vehicle communicator 21b receives the vehicle information message from the in-vehicle communication device 150 after the inhibition control is started, as illustrated in FIG. 10. In other words, the cyclic transmission of the roadside-to-vehicle message (specifically, transmission with the basic cycle) is resumed. Thus, when the in-vehicle communication device 150 is considered to have appeared within the communication range of the wireless roadside device 200, the wireless roadside device 200 can provide the roadside-to-vehicle message.

In the example of FIG. 10, after starting the cyclic transmission of the roadside-to-vehicle message (step S301), the controller 22 of the wireless roadside device 200 determines whether the roadside-to-vehicle communicator 21b has received the vehicle information message from the in-vehicle communication device 150 (step S302). When the roadside-to-vehicle communicator 21b is determined not to have received the vehicle information message from the in-vehicle communication device 150 (step S302: NO), the controller 22 of the wireless roadside device 200 starts the inhibition control (step S303).

Subsequently, the controller 22 of the wireless roadside device 200 determines whether the roadside-to-vehicle communicator 21b has received the vehicle information message from the in-vehicle communication device 150 (step S304). When the roadside-to-vehicle communicator 21b is determined to have received the vehicle information message from the in-vehicle communication device 150 (step S304: YES), the controller 22 of the wireless roadside device 200 stops the inhibition control (step S305) and resumes the cyclic transmission of the roadside-to-vehicle message (step S301).

Such inhibition control may be applied to the transmission of the second roadside-to-vehicle message described above, without being applied to the transmission of the first roadside-to-vehicle message described above. To be more specific, when the roadside-to-vehicle communicator 21b receives no vehicle information message from the in-vehicle communication device 150, the controller 22 of the wireless roadside device 200 applies the inhibition control to the transmission of the second roadside-to-vehicle message without applying the inhibition control to the transmission of the first roadside-to-vehicle message.

Since the second roadside-to-vehicle message is transmitted with the short cycle, applying the inhibition control to the transmission of the second roadside-to-vehicle message allows enhancement of the effect of improving the utilization efficiency of radio resources and the effect of reducing the power consumption of the wireless roadside device 200. The inhibition control is not applied to the first roadside-to-vehicle message, allowing maintenance of reliability in providing the first roadside-to-vehicle message to the in-vehicle communication device 150.

On the other hand, when the inhibition control inhibits the cyclic transmission of the roadside-to-vehicle message, a different wireless roadside device 200 can desirably utilize roadside-to-vehicle communication resources (time slots or sub-slots) allocated to the transmission of the roadside-to-vehicle message. This allows the utilization efficiency of radio resources to be enhanced.

Figure 11:
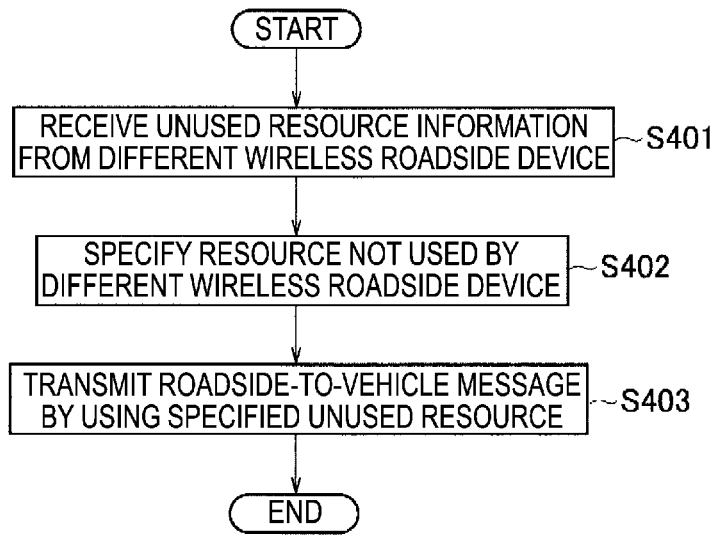
FIG. 11 is a diagram illustrating the second operation example of the traffic communication system according to an embodiment.

For example, as illustrated in FIG. 11, the inter-roadside communicator 21c of the wireless roadside device 200 receives, from a different wireless roadside device 200, information specifying roadside-to-vehicle communication resources not used by the different wireless roadside device 200 due to the inhibition control among the roadside-to-vehicle communication resources allocated to the different wireless roadside device 200 (step S401). Such information is, for example, identification information (identification numbers) of time slots or sub-slots not used by the different wireless roadside device 200 due to the inhibition control. Based on the information, the controller 22 of the wireless roadside device 200 specifies the time slots or sub-slots not used by the different wireless roadside device 200 due to the inhibition control (step S402). The controller 22 of the wireless roadside device 200 controls the roadside-to-vehicle communicator 21b to transmit the roadside-to-vehicle message by using the specified time slots or sub-slots (step S403).

Figure 12:
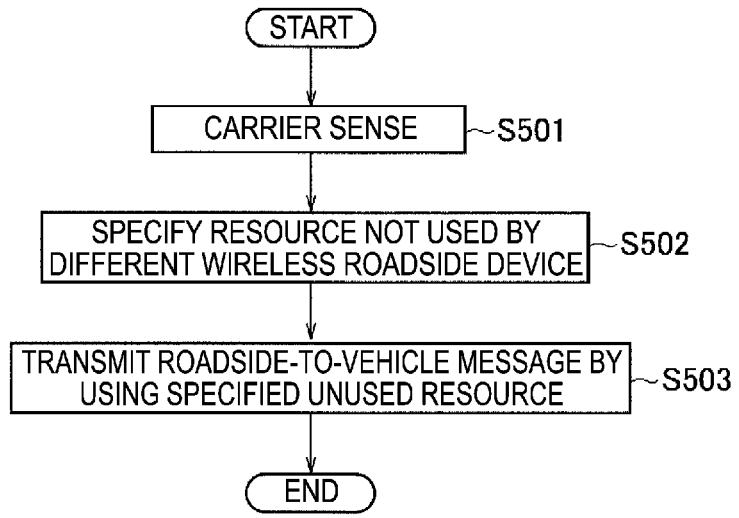
FIG. 12 is a diagram illustrating the second operation example of the traffic communication system according to an embodiment.

Alternatively, as illustrated in FIG. 12, with the carrier-sensing (step S501), the controller 22 of the wireless roadside device 200 may specify (step S502) roadside-to-vehicle communication resources not used by the different wireless roadside device 200 due to the inhibition control among the roadside-to-vehicle communication resources allocated to the different wireless roadside device 200. The controller 22 of the wireless roadside device 200 controls the roadside-to-vehicle communicator 21b to transmit the roadside-to-vehicle message by using the specified time slots or sub-slots (step S503).

Other Embodiments

Figure 13:
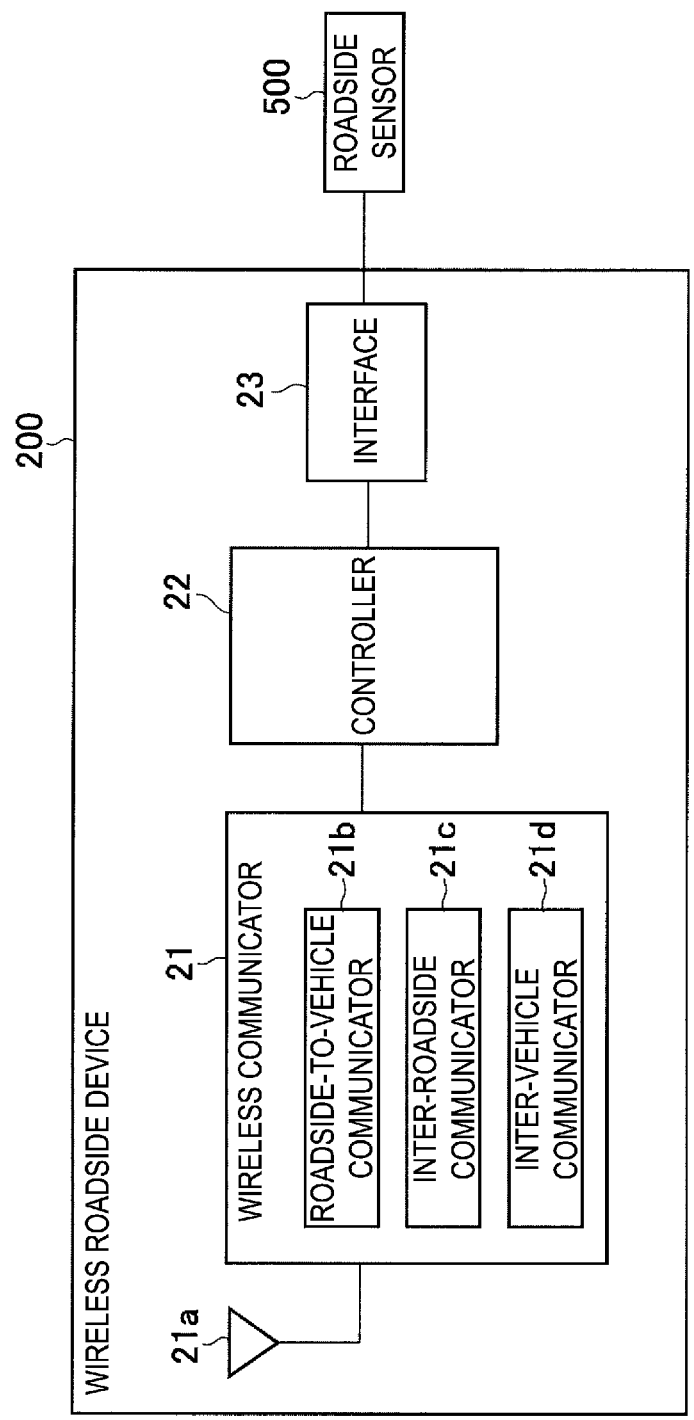
FIG. 13 is a diagram illustrating a variation of a configuration of a wireless roadside device according to an embodiment.

In the above-described embodiment, as illustrated in FIG. 13, the wireless roadside device 200 may further include an inter-vehicle communicator 21d that transmits an inter-vehicle message. The inter-vehicle communicator 21d may perform carrier-sensing to determine whether radio frequencies (for example, 700 MHz band) are available, and transmit the inter-vehicle message at a timing determined depending on the result of the carrier-sensing. When the controller 22 detects a danger based on the output of the roadside sensor 500, the inter-vehicle communicator 21d transmits the inter-vehicle message indicating the presence of the danger. Thus, the wireless roadside device 200 can notify the vehicle 100 (in-vehicle communication device 150) of the danger by utilizing the inter-vehicle message.

In the above-described embodiment, the server apparatus 400 may be an edge server disposed near the wireless roadside device 200. Such an edge server may be considered part of the wireless roadside device 200. The edge server is provided between the wireless roadside device 200 and the Internet and manages the road within an area limited to a predetermined range. The edge server may be connected to the wireless roadside device 200 via a local area network (LAN) without using a wide area network (WAN).

In the above-described embodiment, the server apparatus 400 may include the functions of the controller 22 of the wireless roadside device 200. In other words, the server apparatus 400 may include the above-described controller 22.

A program that causes a computer to execute each of the processing operations according to the embodiments described above may be provided. The program may be recorded on a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Embodiments have been described above in detail with reference to the drawings, but specific configurations are not limited to those described above, and various design variation can be made without departing from the gist of the present disclosure.

REFERENCE SIGNS

1: Traffic communication system
11: Wireless communicator
11a: Antenna
11b: Roadside-to-vehicle communicator
11c: Inter-vehicle communicator
12: GNSS receiver
13: Presentation unit
14: Drive controller
15: Controller
21: Wireless communicator
21a: Antenna
21b: Roadside-to-vehicle communicator
21c: Inter-roadside communicator
21d: Inter-vehicle communicator
22: Controller
23: Interface
100: Vehicle
150: In-vehicle communication device
200: Wireless roadside device
300: Traffic light
400: Server apparatus
500: Roadside sensor
601: Obstacle

The invention claimed is:

1. A wireless roadside device configured to perform roadside-to-vehicle communication with an in-vehicle communication device in a traffic communication system, the wireless roadside device comprising:
a roadside-to-vehicle communicator configured to cyclically transmit a roadside-to-vehicle message; and
a controller configured to perform inhibition control configured to inhibit cyclic transmission of the roadside-to-vehicle message when the roadside-to-vehicle communicator receives no vehicle information message from the in-vehicle communication device.

2. The wireless roadside device according to claim 1, wherein
the inhibition control comprises control configured to stop cyclic transmission of the roadside-to-vehicle message.

3. The wireless roadside device according to claim 1, wherein
the inhibition control comprises control configured to extend a cycle of transmitting the roadside-to-vehicle message.

4. The wireless roadside device according to claim 1, wherein
the controller stops the inhibition control when the roadside-to-vehicle communicator receives the vehicle information message from the in-vehicle communication device, after the controller starts the inhibition control.

5. The wireless roadside device according to claim 1, further comprising
an inter-roadside communicator configured to perform inter-roadside communication with a different wireless roadside device different from the wireless roadside device, wherein
the inter-roadside communicator receives, from the different wireless roadside device, information configured to specify, among roadside-to-vehicle communication resources allocated to the different wireless roadside device, a roadside-to-vehicle communication resource not used by the different wireless roadside device due to the inhibition control, and
the roadside-to-vehicle communicator transmits the roadside-to-vehicle message by using the specified roadside-to-vehicle communication resource.

6. The wireless roadside device according to claim 1, wherein
the controller specifies, by carrier-sensing and among roadside-to-vehicle communication resources allocated to a different wireless roadside device different from the wireless roadside device, a roadside-to-vehicle communication resource not used by the different wireless roadside device due to the inhibition control, and
the roadside-to-vehicle communicator transmits the roadside-to-vehicle message by using the specified roadside-to-vehicle communication resource.

7. The wireless roadside device according to claim 1, wherein
the roadside-to-vehicle communicator transmits, with a predetermined cycle, a first roadside-to-vehicle message having a predetermined format and transmits, with a short cycle shorter than the predetermined cycle, a second roadside-to-vehicle message related to presence or absence of a danger in traffic, and
the controller applies the inhibition control to transmission of the second roadside-to-vehicle message without applying the inhibition control to transmission of the first roadside-to-vehicle message when the roadside-to-vehicle communicator receives no vehicle information message from the in-vehicle communication device.

8. The wireless roadside device according to claim 1, further comprising
an inter-vehicle communicator configured to transmit an inter-vehicle message, wherein
the inter-vehicle communicator transmits the inter-vehicle message indicating the presence of the danger when the controller detects the danger.

9. A traffic communication system comprising:
a wireless roadside device comprising a roadside-to-vehicle communicator configured to perform roadside-to-vehicle communication with an in-vehicle communication device; and
a controller configured to control the roadside-to-vehicle communicator, wherein
the roadside-to-vehicle communicator cyclically transmits a roadside-to-vehicle message, and
the controller performs inhibition control configured to inhibit cyclic transmission of the roadside-to-vehicle message when the roadside-to-vehicle communicator receives no vehicle information message from the in-vehicle communication device.

10. A traffic communication method used in a traffic communication system configured to perform roadside-to-vehicle communication between an in-vehicle communication device and a wireless roadside device, the traffic communication method comprising:
cyclically transmitting, by the wireless roadside device, a roadside-to-vehicle message; and
performing, by the wireless roadside device, inhibition control configured to inhibit cyclic transmission of the roadside-to-vehicle message when the wireless roadside device receives no vehicle information message from the in-vehicle communication device.

* * * * *